June 19, 1928.

W. T. POWELL 1,674,297

FREQUENCY CONVERTER

Filed March 6, 1923

INVENTOR
WINFRED T. POWELL

BY D. Clyde Jones.

ATTORNEY

Patented June 19, 1928.

1,674,297

UNITED STATES PATENT OFFICE.

WINFRED T. POWELL, OF ROCHESTER, NEW YORK, ASSIGNOR TO THE STROMBERG-CARLSON TELEPHONE MANUFACTURING COMPANY, OF ROCHESTER, NEW YORK, A CORPORATION OF NEW YORK.

FREQUENCY CONVERTER.

Application filed March 6, 1923. Serial No. 623,261.

This invention relates to a ringing current machine and more particularly to that type of a ringing current machine known as a frequency converter.

In former ringing current devices it has been customary to employ mechanical rectifiers and also a mechanical vibrator cooperating therewith to transform the current derived from the commercial power circuit into ringing current of proper frequency and voltage to operate the signal or bell at a telephone station. Such an arrangement has the disadvantage that the contacts of the vibrators and the mechanical rectifiers must be provided with heavy contact points and be protected by spark condensers. Such an arrangement has also the disadvantage that noises are introduced into the storage battery of the telephone exchange due to the operation of the various vibrators therefrom.

The present invention has for its purpose the use of one or more thermionic devices instead of one or more of the mechanical devices as now used in such frequency converters.

Other features of the invention will appear from the description and appended claims.

Figure 1:
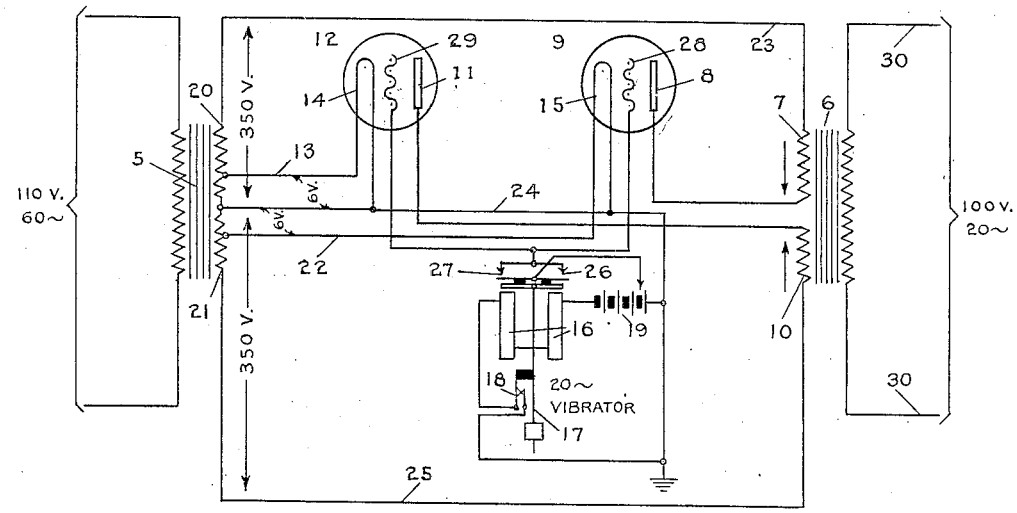
Figure 2:
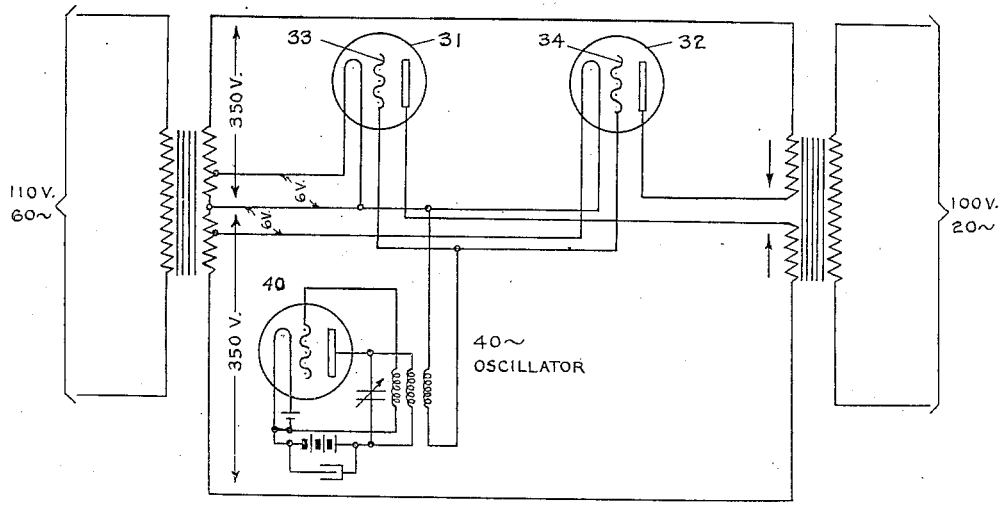

In the drawings Fig. 1 diagrammatically represents the circuit arrangement by which a commercial source of current of 110 volts and 60 cycles frequency is converted into ringing current of 100 volts and 20 cycles frequency. Fig. 2 is a circuit arrangement similar to that disclosed in Fig. 1 except that all of the controllers including the oscillator are of the thermionic tube type.

It is believed that the invention will best be understood by describing the circuit operation of the diagram of Fig. 1. At the left of this figure there is represented a source of current of 110 volts and 60 cycle frequency which is connected across the primary of the transformer 5 designed to step up the voltage to 350 volts. The secondary of this transformer is connected through the upper section 7 of a second transformer 6 to the plate 8 of a vacuum tube, generally designated 9. The other end of the secondary coil of the transformer 5 is connected over conductor 25 through the lower section 10 of the transformer 6 to the plate 11 of a second vacuum tube generally designated 12. Conductors 13, 22 and 24 are connected at such points of the secondary of the transformer 5 so that current of the proper voltage is provided for lighting the filaments 14 and 15 of the vacuum tubes 9 and 12. In the lower part of the diagram there is represented a mechanical vibrator or oscillator which consists of a pair of electromagnets 16 and which controls an armature carrying a pendulum 17. The pendulum controls a pair of contacts 18 to interrupt the operating circuit of the electromagnet 16 which includes the local battery 19.

In the operation of the converter, at that portion of the wave of originating current transmitted to the transformer 5 when the secondary terminal 20 is positive, the plate 8 of the vacuum tube 9 is positive permitting current to flow in the plate-filament circuit of the vacuum tube 9. This plate filament circuit may be described as extending from the plate 8 to the primary winding of the transformer 6, conductor 23, secondary winding of transformer 5, conductor 24, the filament 15 of the vacuum tube 9. When the terminal 21 of the secondary winding of the transformer 5 is positive, the plate 11 of the vacuum tube 12 is made positive over conductor 25 so that current flows in the plate-filament circuit of this last named vacuum tube. It will be noted that the plate circuits of both of these mentioned vacuum tubes include the primary windings 7 and 10 of the transformer 6. The transformer is of such design that if the vibrator were omitted, current of 100 volts and 60 cycles would be induced in the secondary of this transformer. The function of the mechanical vibrator is to change the current in the out-put circuit to a frequency of 20 cycles.

The vibrator is designed to oscillate or vibrate at a frequency of 20 cycles and its contacts 26 and 27 are closed at each half cycle that is forty closures per second. On each closure of each of the contacts 26 and 27, a source of negative potential from battery 19 is connected to the grids 28 and 29 of the vacuum tubes 9 and 12 thus blocking the current flow through these vacuum tubes forty times out of sixty with the result that 20 cycle current is produced in the out-put circuit generally designated 30.

In the modification of the invention disclosed in Fig. 2 the vacuum tube oscillator generally designated 40 replaces the mechanical vibrator of Fig. 1. It is believed to be unnecessary to describe the operation of the vacuum tubes 31 and 32 since their operation is identical with that of the vacuum tubes 9 and 12 of Fig. 1. The oscillator 40 is designed to apply negative potential to the grids 33 and 34 forty times each second, in the same manner as the vibrator 20.

While the specific values of voltage and frequency have been referred to, it will be understood that this reference is simply for purposes of description and that there may be wide variations in voltage and frequency introduced in the in-put circuit and that the constants of these circuits may be so varied that the out-put voltages and frequencies may be likewise greatly varied. The operation of the vacuum tube oscillator is also not limited to the specific number of oscillations referred to in this description.

What is claimed is:—

1. In a frequency converter for signaling systems and the like, a source of alternating current, a transformer having a primary winding and a secondary winding, a circuit serially including said primary winding and said source of alternating current, a plurality of thermionic devices, each having a filament, a plate and a grid, each of said filaments being connected across a portion of said secondary winding, grid circuits connecting said grids and said filaments, a second transformer having primary and secondary windings, the plate elements of said thermionic devices being connected to the secondary winding of said first transformer through a primary winding of said second transformer, and an additional thermionic device having a plate circuit and a grid circuit arranged to interact, said last mentioned thermionic device being arranged to control said first mentioned grids.

2. In a frequency converter for signaling systems and the like, a source of alternating current, a transformer having a primary winding and a secondary winding, a circuit including said primary winding and said source of alternating current, a plurality of thermionic devices, each having a filament, a plate and a grid, means for rendering said filaments active including a portion of said secondary winding, said grids being connected in multiple to the mid-point of said secondary winding, a second transformer having primary and secondary windings, the plate elements of said thermionic devices being connected to the secondary winding of said first transformer through a primary winding of said second transformer, an additional thermionic device provided with interacting grid and plate circuits, said last mentioned plate circuit being inductively associated with said first mentioned grids, and an outgoing circuit connected to the secondary winding of said second transformer.

3. In a frequency converter for signaling systems and the like, a source of alternating current, a transformer having a primary winding and a secondary winding, a circuit including said primary winding and said source of alternating current, a plurality of thermionic devices, each having a filament, a plate and a grid, each of said filaments being connected across a portion of said secondary winding, said grids being connected in multiple to the mid-point of said secondary winding and being connected to said filaments to form grid circuits having a portion in common, a winding of an induction coil in said common portion of said grid circuits, a second transformer having primary and secondary windings, plate elements of said thermionic devices connected to the secondary winding of said first transformer through a primary winding of said second transformer, an additional thermionic device provided with interacting grid and plate circuits, a second winding of said induction coil in said last-mentioned plate circuit inductively associated with the winding in said grid circuits, and an outgoing circuit connected to the secondary winding of said second transformer.

In witness whereof, I hereunto subscribe my name this 2nd day of March, A. D. 1923.

WINFRED T. POWELL.